United States Patent Office 2,757,173
Patented July 31, 1956

2,757,173

AZO COMPOUNDS CONTAINING A β-CYANO-β-FLUOROMETHYLETHYLAMINO GROUP

Joseph B. Dickey and Edmund B. Towne, Kingsport, Tenn., assignors to Eastman Kodak Company, Rochester, N. Y., a corporation of New Jersey No Drawing. Application April 16, 1952,
Serial No. 282,685

9 Claims. (Cl. 260—207.5)

This invention relates to new azo compounds and their application to the art of dyeing or coloring. The invention also includes the new intermediate compounds used in the preparation of the new azo compounds of the invention.

The azo compounds of the present invention have the general formula:

I.

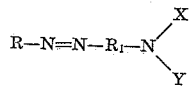

wherein R represents a radical of the benzene series free of water-solubilizing groups, $R_1$ represents an arylene radical of the benzene series free of water-solubilizing groups, X represents a β-cyano-β-difluoromethylethyl group or a β-cyano-β-trifluoromethylethyl group and Y represents a hydrogen atom, an alkyl group having 1 to 6, inclusive, carbon atoms, a hydroxyalkyl group having 2 to 5, inclusive, carbon atoms, an alkoxyalkyl group having 3 to 6, inclusive, carbon atoms, a hydroxyalkoxyalkyl group having 4 to 6, inclusive, carbon atoms, a cyanoalkyl group having 2 to 6, inclusive, carbon atoms, an alkenyl group having 2 to 4, inclusive, carbon atoms or a —$(CH_2)_m$—$COOR_2$ group, wherein $m$ is 1, 2 or 3 and $R_2$ represents an alkyl group having 1 to 4, inclusive, carbon atoms and wherein the

grouping is joined to a carbon atom of the arylene radical $R_1$ in para position to the azo bond shown.

The azo compounds of the present invention are valuable dyes for coloring cellulose alkyl carboxylic acid ester, having two to four carbon atoms in the acid groups thereof, textile materials, as well as wool, silk, nylon, polyethylene terephthalate, and modified polyacrylonitrile textile materials. They are especially of use for the coloration of cellulose acetate textile materials. When applied to the aforesaid materials, they yield, for example, orange-yellow, orange, reddish-orange, brownish-orange, red and reddish-blue dyeings.

It is an object of the present invention to provide new azo compounds. Another object is to provide a satisfactory process for the preparation of the new azo compounds. A further object is to provide dyed textile materials, especially cellulose acetate textile materials, which have good fastness to light and gas. A still further object is to provide new intermediate compounds.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

While the invention relates broadly to the azo compounds having the formula numbered I it is particularly directed to certain azo compounds which appear to have superior dyeing properties and which are represented, in large part, by the general formula:

II.

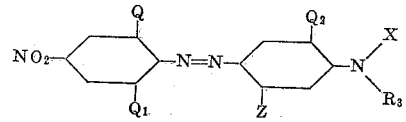

wherein Q represents a hydrogen atom, a bromine atom, a chlorine atom or a trifluoromethyl group, $Q_1$ represents a chlorine atom, a bromine atom, a fluorine atom, a trifluoromethyl group or a methylsulfonyl group, $Q_2$ represents a hydrogen atom, a methoxy group or an ethoxy group, $R_3$ represents a β-hydroxyethyl group, a γ-hydroxypropyl group of a β,γ-dihydroxypropyl group, X represents a β-cyano-β-difluoromethylethyl group or a β-cyano-β-trifluoromethylethyl group and Z represents a hydrogen atom, a chlorine atom, a bromine atom, a fluorine atom, a methyl group or an ethyl group.

Compounds having the formula:

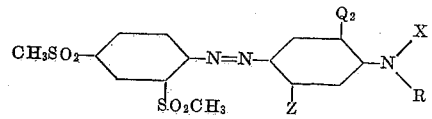

wherein $Q_2$, $R_2$, X and Z have the meaning previously assigned to them, likewise are among the compounds which appear to have superior dyeing properties.

The new azo compounds of the invention are prepared by diazotizing a primary amine of the benzene series free of water-solubilizing groups and coupling the diazonium compound obtained with a coupling compound having the formula:

III.

wherein B represents an aryl nucleus of the benzene series free of water-solubilizing groups and X and Y have the meaning previously assigned to them.

Illustrative of the alkyl groups represented by Y are the methyl, the ethyl, the n-propyl, the isopropyl, the n-butyl, the n-amyl and the n-hexyl groups. Illustrative of the alkoxyalkyl groups represented by Y are the β-methoxyethyl, β-ethoxyethyl, β-n-propoxyethyl, β-n-butoxyethyl, γ-n-propoxypropyl and the δ-ethoxybutyl groups. Similarly, the β-hydroxyethyl, the β-hydroxypropyl, the γ-hydroxypropyl, the β,γ-dihydroxypropyl, the β-methyl-β,γ-dihydroxypropyl, the δ-hydroxybutyl, the ε-hydroxyamyl and the δ,ε-dihydroxyamyl groups are illustrative of the hydroxyalkyl groups Y represents.

Illustrative of the hydroxyalkoxyalkyl groups Y represents are the β-hydroxyethoxyethyl (—$CH_2CH_2OCH_2CH_2OH$), the β-hydroxyethoxyethoxyethyl (—$CH_2CH_2OCH_2CH_2OCH_2CH_2OH$)

and the γ-hydroxypropoxy-n-propyl groups. Illustrative of the cyanoalkyl groups Y represents are the β-cyanoethyl, the γ-cyanopropyl, the δ-cyanobutyl and the ε-cyanopentyl groups. The vinyl, the allyl, the methallyl and the crotyl groups are illustrative of the alkenyl groups Y represents. Illustrative of the

groups Y represents are the —$CH_2COOCH_3$, the
—$CH_2COOC_2H_5$, the —$CH_2COOCH_2CH_2CH_2CH_3$, the —$CH_2CH_2COOCH_3$, the —$CH_2CH_2COOC_2H_5$, the —$CH_2CH_2COOCH_2CH_2CH_2CH_3$, the —$CH_2CH_2CH_2COOCH_3$, the —$CH_2CH_2CH_2COOC_2H_5$ and the —$CH_2CH_2CH_2COOCH_2CH_2CH_2CH_3$ groups.

The following examples illustrate the azo compounds of the invention and their manner of preparation. Parts are expressed as parts by weight.

EXAMPLE 1

A. *Nitrosyl sulfuric acid.*—7.6 parts of dry sodium nitrite were added, with stirring, to 92 parts of sulfuric acid (sp. gr. 1.84) while keeping the temperature below 70° C. The resulting solution was then cooled to 5° C.–10° C. and 100 parts of acetic acid were added dropwise, with stirring, while maintaining the temperature at 5° C.–10° C.

B. *Diazotization.*—24.9 parts of 2,4-bis(methylsulfonyl)-aniline were added slowly, with stirring, to the nitrosyl sulfuric acid prepared as described above, while keeping the temperature below 20° C. Then, 100 parts of acetic acid were added dropwise, with stirring, at a temperature between 15° C.–20° C., and stirring was continued until all the 2,4-bis(methylsulfonyl)-aniline had dissolved and diazotization was complete. The diazonium solution thus formed was then poured onto 500 parts of crushed ice, and enough urea was added to destroy the excess nitrous acid. The diazonium solution should be clear and free of suspended undiazotized amine.

C. *Coupling.*—The diazonium solution prepared as described in B was added, with stirring, to 24 parts of N-β-cyano-β-difluoromethylethyl-N-β-hydroxyethylaniline dissolved in 200 parts of ice and water and 17.5 parts of aqueous hydrochloric acid (sp. gr. 1.16). The coupling reaction which takes place was completed by adding portionwise just sufficient sodium acetate or sodium carbonate to neutralize the acid present in the reaction mixture. The dye compound formed was recovered by filtration, washed with water and dried. It has the formula

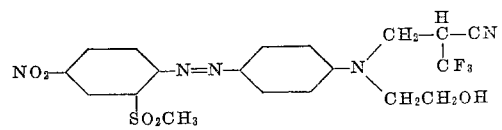

and colors cellulose acetate textile materials orange shades.

EXAMPLE 2

20.7 parts of 4-nitro-2,6-dichloroaniline were added portionwise, with stirring, to a nitrosyl sulfuric acid mixture prepared as described in A of Example 1 and simultaneously 100 parts of cold glacial acetic acid were added. The reaction mixture was stirred while keeping the temperature at about 15° C. until the diazotization reaction was complete. A clear yellowish diazonium solution was obtained.

The diazonium solution prepared as described above was added, with stirring, to 24 parts of N-β-cyano-β-difluoromethylethyl-N-β-hydroxyethylaniline dissolved in 200 parts of ice and water and 17.5 parts of aqueous hydrochloric acid (sp. gr. 1.16). The coupling reaction which takes place was completed by adding portionwise just sufficient sodium acetate or sodium carbonate to neutralize the acid present in the reaction mixture. The dye compound formed was recovered by filtration, washed with water and dried. It colors cellulose acetate textile materials brownish-orange shades.

EXAMPLE 3

21.6 parts of finely powdered 5-nitro-2-aminophenylmethylsulfone were added slowly, with stirring, to the nitrosyl sulfuric acid reaction mixture prepared as described in Example 1. The reaction temperature was maintained below 20° C. After the addition of the amine, 100 parts of acetic acid were added dropwise, with stirring, and the reaction mixture was stirred at 15° C.-20° C. until all of the amine had dissolved and the diazotization reaction which takes place was complete. The diazonium solution was then poured onto 500 parts of crushed ice and enough urea or sulfamic acid was added to destroy the excess nitrous acid. The diazonium solution should be clear and free of suspended, undiazotized amine.

The diazonium solution prepared as described above was added, with stirring, to 25.8 parts of N-β-cyano-β-trifluoromethylethyl-N-β-hydroxyethylaniline dissolved in 200 parts of ice and water and 17.5 parts of aqueous hydrochloric acid (sp. gr. 1.16). The coupling reaction which takes place was completed by adding portionwise just sufficient sodium carbonate to neutralize the acid present in the reaction mixture. The dye compound formed was recovered by filtration, washed with water and dried. It has the formula:

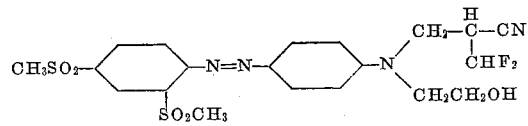

and colors cellulose acetate textile materials reddish-orange shades.

EXAMPLE 4

21.6 parts of 5-nitro-2-aminophenylmethylsulfone were diazotized and the diazonium compound obtained was coupled with 27.2 parts of N-β-cyano-β-trifluoromethylethyl-N-β-hydroxylethyl-m-toluidine. Diazotization, coupling and recovery of the dye compound formed were carried out in accordance with the procedure described in Example 3. The dye compound thus obtained colors cellulose acetate textile materials orange-red shades.

EXAMPLE 5

21.6 parts of 5-nitro-2-aminophenylmethylsulfone were diazotized and the diazonium compound obtained was coupled with 29.3 parts of N-β-cyano-β-trifluoromethylethyl - N-β-hydroxyethyl-m-chloroaniline. Diazotization, coupling and recovery of the dye compound formed were carried out in accordance with the procedure described in Example 3. The dye compound thus obtained colors cellulose acetate textile materials pinkish-orange shades.

EXAMPLE 6

17.3 parts of o-chloro-p-nitroaniline were dissolved in 150 parts of water and 29.5 parts of 36% hydrochloric acid. The solution resulting was cooled to a temperature of approximately 0° C.–5° C. and the o-chloro-p-nitroaniline was diazotized while maintaining this temperature by the addition, with stirring, of a water solution of 6.9 parts of sodium nitrite.

The diazonium solution prepared as described above was added, with stirring, to 28.8 parts of N-β-cyano-β-trifluoromethylethyl - N - b,γ-dihydroxypropylaniline dissolved in 200 parts of ice and water and 17.5 parts of aqueous hydrochloric acid (sp. gr. 1.16). The coupling reaction which takes place was completed by adding portionwise just sufficient sodium carbonate to neutralize the acid present in the reaction mixture. The dye compound formed was recovered by filtration, washed with water and dried. It colors cellulose acetate textile materials reddish-orange shades.

EXAMPLE 7

20.6 parts of 1-amino-2-trifluoromethyl-4-nitrobenzene were diazotized and the diazonium compound obtained was coupled with 27.2 parts of N-β-cyano-β-trifluoromethylethyl - N - γ-hydroxypropylaniline. Diazotization, coupling and recovery of the dye compound formed were carried out in accordance with the procedure described in Example 1. The dye compound thus obtained colors cellulose acetate textile material orange shades.

EXAMPLE 8

24.1 parts of 4-nitro-2-trifluoromethyl-6-chloroaniline were diazotized and the diazonium compound obtained was coupled with 27 parts of N-β-cyano-β-difluoromethylethyl-N-β,γ-dihydroxypropylaniline. Diazotization, coupling and recovery of the dye compound formed were carried out in accordance with the procedure described in Example 2. The dye compound thus obtained colors cellulose acetate textile materials reddish-orange shades.

EXAMPLE 9

28.5 parts of 4-nitro-2-trifluoromethyl-6-bromoaniline were diazotized and the diazonium compound obtained was coupled with 25.4 parts of N-β-cyano-β-difluoromethylethyl-N-γ-hydroxypropylaniline. Diazotization, coupling and recovery of the dye compound formed were carried out in accordance with the procedure described in Example 2. The dye compound thus obtained colors cellulose acetate textile materials brownish-orange shades.

EXAMPLE 10

27.4 parts of 4-nitro-2,6-di-trifluoromethylaniline were diazotized and the diazonium compound obtained was coupled with 28.4 parts of N-β-cyano-β-difluoromethylethyl-N-β-hydroxyethyl-2-methoxy-5-methylaniline. Diazotization, coupling and recovery of the dye compound formed were carried out in accordance with the procedure described in Example 1. The dye compound thus obtained colors cellulose acetate textile materials brownish-orange shades.

EXAMPLE 11

13.8 parts of p-nitroaniline were diazotized and the diazonium compound obtained was coupled with 26.8 parts of N-β-cyano-β-difluoromethylethyl-N-β-hydroxyethyl-m-ethylaniline. Diazotization, coupling and recovery of the dye compound formed were carried out in accordance with the procedure described in Example 6. The dye compound thus obtained colors cellulose acetate textile materials reddish-orange shades.

EXAMPLE 12

25.2 parts of 4-nitro-2-chloro-6-bromoaniline were diazotized and the diazonium compound obtained was coupled with 25.4 parts of N-β-cyano-β-difluoromethylethyl-N-β-hydroxyethyl-m-toluidine. Diazotization, coupling and recovery of the dye compound formed were carried out in accordance with the procedure described in Example 2. The dye compound thus obtained colors cellulose acetate textile materials brownish-orange shades.

EXAMPLE 13

15.6 parts of o-fluoro-p-nitroaniline were diazotized and the diazonium compound obtained was coupled with 22.8 parts of N-β-cyano-β-trifluoromethylethyl-N-methylaniline. Diazotization, coupling and recovery of the dye compound formed were carried out in accordance with the procedure described in Example 6. The dye compound thus obtained colors cellulose acetate textile materials reddish-orange shades.

EXAMPLE 14

24.9 parts of 2,4-bis(methylsulfonyl)-aniline were diazotized and the diazonium compound obtained was coupled with 25.8 parts of N-β-cyano-β-trifluoromethylethyl-N-β-hydroxyethylaniline. Diazotization, coupling and recovery of the dye compound formed were carried out in accordance with the procedure described in Example 1. The dye compound thus obtained colors cellulose acetate textile materials orange shades.

By the use of 27.2 parts of N-β-cyano-β-trifluoromethylethyl-N-γ-hydroxypropylaniline in place of N-β-cyano-β-trifluoromethylethyl-N-β-hydroxyethylaniline, a dye compound is obtained which colors cellulose acetate textile materials orange shades.

EXAMPLE 15

24.9 parts of 2,4-bis(methylsulfonyl)-aniline were diazotized and the diazonium compound obtained was coupled with 28.8 parts of N-β-cyano-β-trifluoromethylethyl-N-β,γ-dihydroxypropylaniline. Diazotization, coupling and recovery of the dye compound formed were carried out in accordance with the procedure described in Example 1. The dye compound thus obtained colors cellulose acetate textile materials orange shades.

By the use of 30.2 parts of N-β-cyano-β-trifluoromethylethyl-N-β,N-dihydroxypropyl-m-toluidine in place of N-β-cyano-β-trifluoromethylethyl - N - β,γ-dihydroxypropylaniline, a dye compound is obtained which colors cellulose acetate textile materials pinkish-orange shades.

EXAMPLE 16

24.9 parts of 2,4-bis(methylsulfonyl)-aniline were diazotized and the diazonium compound obtained was coupled with 29.3 parts of N-β-cyano-β-trifluoromethylethyl-N-β-hydroxyethyl-m-chloroaniline. Diazotization, coupling and recovery of the dye compound formed were carried out in accordance with the procedure described in Example 1. The dye compound thus obtained colors cellulose acetate textile materials yellowish-orange shades.

EXAMPLE 17

24.9 parts of 2,4-bis(methylsulfonyl)-aniline were diazotized and the diazonium compound obtained was coupled with 26.8 parts of N-β-cyano-β-difluoromethylethyl-N-δ-hydroxybutylaniline. Diazotization, coupling and recovery of the dye compound formed were carried out in accordance with the procedure described in Example 1. The dye compound thus obtained colors cellulose acetate textile materials orange shades.

By the use of 28.2 parts of N-β-cyano-β-difluoromethylethyl-N-ε-hydroxyamylaniline in place of N-β-cyano-β-difluoromethylethyl-N-δ-hydroxybutylaniline, a dye compound is obtained which colors cellulose acetate textile materials orange shades.

EXAMPLE 18

24.1 parts of 4-nitro-2-trifluoromethyl-6-chloroaniline were diazotized and the diazonium compound obtained was coupled with 30.2 parts of N-β-cyano-β-trifluoromethylethyl-N-β-hydroxy-β-ethoxyethylaniline. Diazotization, coupling and recovery of the dye compound formed were carried out in accordance with the procedure described in Example 2. The dye compound thus obtained colors cellulose acetate textile materials brownish-orange shades.

By the use of 34.6 parts of N-β-cyano-β-trifluoromethylethyl-N-β-hydroxy-β-ethoxy-β-ethoxyethylaniline in place of N-β-cyano-β-trifluoromethylethyl - N-β-hydroxy-β-ethoxyethylaniline, a dye compound is obtained which colors cellulose acetate textile materials brownish-orange shades.

EXAMPLE 19

20.7 parts of 4-nitro-2,6-dichloroaniline were diazotized and the diazonium compound obtained was coupled with 24.9 grams of N-β-cyano-β-difluoromethylethyl-N-β-cyanoethylaniline. Diazotization, coupling and recovery of the dye compound formed were carried out in accordance with the procedure described in Example 2. The dye compound thus obtained colors cellulose acetate textile materials brownish-orange shades.

By the use of 26.3 parts of N-β-cyano-β-difluoromethylethyl-N-γ-cyanopropylaniline in place of N-β-cyano-β-difluoromethylethyl-N-β-cyanoethylaniline, a dye compound is obtained which colors cellulose acetate textile materials brownish-orange shades.

EXAMPLE 20

21.6 parts of 5-nitro-2-aminophenylmethylsulfone were diazotized and the diazonium compound obtained was coupled with 29.1 parts of N-β-cyano-β-difluoromethylethyl-N-ε-cyanopentylaniline. Diazotization, coupling and recovery of the dye compound formed were carried out in accordance with the procedure described in Example 3. The dye compound thus obtained colors cellulose acetate textile materials orange shades.

EXAMPLE 21

21.6 parts of 5-nitro-2-aminophenylmethylsulfone were diazotized and the diazonium compound obtained was coupled with 25.4 parts of N-β-cyano-β-trifluoromethylethyl-N-allylaniline. Diazotization, coupling and recovery of the dye compound formed were carried out in accordance with the precedure described in Example 3. The dye compound thus obtained colors cellulose acetate textile materials yellowish-orange shades.

By the use of 24 parts of N-β-cyano-β-trifluoromethylethyl-N-vinylaniline in place of N-β-cyano-β-trifluoromethylethyl-N-allylaniline, a dye compound is obtained which colors cellulose acetate textile materials yellowish-orange shades.

EXAMPLE 22

21.6 parts of 5-nitro-2-aminophenylmethylsulfone were diazotized and the diazonium compound obtained was coupled with 28.6 parts of N-β-cyano-β-trifluoromethylethyl-N-CH₂COOCH₃-aniline. Diazotization, coupling and recovery of the dye compound formed were carried out in accordance with the procedure described in Example 3. The dye compound thus obtained colors cellulose acetate textile materials orange shades.

By the use of 32.8 parts of N-β-cyano-β-trifluoromethylethyl-N-CH₂COOCH₂CH₂CH₂CH₃-aniline in place of N-β-cyano-β-trifluoromethylethyl-N-CH₂COOCH₃-aniline, a dye compound is obtained which colors cellulose acetate textile materials orange shades.

EXAMPLE 23

20.7 parts of 4-nitro-2,6-dichloroaniline were diazotized and the diazonium compound obtained was coupled with 28.2 parts of N-β-cyano-β-difluoromethylethyl-N-CH₂CH₂COOCH₃-aniline. Diazotization, coupling and recovery of the dye compound formed were carried out in accordance with the procedure described in Example 2. The dye compound thus obtained colors cellulose acetate textile materials brownish-orange shades.

By the use of 29.6 parts of N-β-cyano-β-difluoromethyl-ethyl-N-CH₂CH₂COOC₂H₅-aniline in place of N-β-cyano-β-difluoromethylethyl-N-CH₂CH₂COOCH₃-aniline, a dye compound is obtained which colors cellulose acetate textile materials brownish-orange shades.

The compounds tabulated hereinafter further illustrate the azo compounds of the invention. These compounds are prepared by diazotizing the amines named hereinafter and coupling the diazonium compounds obtained with the coupling components named hereinafter. The color given is that which the azo compounds color cellulose acetate textile materials. The diazotization, coupling and recovery operations are carried out in accordance with the procedure described hereinbefore.

| Amine | Coupling Component | Color |
|---|---|---|
| 2-amino-5-nitrophenylmethylsulfone. | N-β-cyano-β-difluoromethylethylaniline. | reddish-orange. |
| Do. | N-β-cyano-β-difluoromethylethyl-o-chloroaniline. | orange. |
| 2,4-bis(methylsulfonyl)-aniline. | N-β-cyano-β-difluoromethylethyl-o-toluidine. | orange-yellow. |
| Do. | N-β-cyano-β-difluoromethylethyl-o-anisidine. | Do. |
| p-aminoacetophenone. | N-β-cyano-β-trifluoromethylethylaniline. | orange. |
| Do. | N-β-cyano-β-trifluoromethylethyl-o-chloroaniline. | orange-yellow. |
| Do. | N-β-cyano-β-trifluoromethylethyl-o-fluoroaniline. | Do. |
| Do. | N-β-cyano-β-trifluoromethylethyl-m-chloroaniline. | Do. |
| Do. | N-β-cyano-β-trifluoromethylethyl-o-toluidine. | orange. |
| Do. | N-β-cyano-β-trifluoromethylethyl-o-ethylaniline. | Do. |
| 4-amino-3-chlorophenylmethyl ketone. | N-β-cyano-β-trifluoromethylethyl-o-ethoxyaniline. | orange-yellow. |
| Do. | N-β-cyano-β-trifluoromethylethyl-m-toluidine. | Do. |
| o-aminophenylmethylsulfone. | N-β-cyano-β-trifluoromethylethyl-m-ethoxyaniline. | Do. |
| Do. | N-β-cyano-β-trifluoromethylethyl-2-methoxy-5-methylaniline. | orange. |
| p-aminophenylmethylsulfone. | N-β-cyano-β-trifluoromethylethyl-2-methoxy-5-acetaminoaniline. | orange |
| Do. | N-β-cyano-β-difluoromethylethyl-N-β-hydroxyethylaniline. | orange-yellow. |
| p-nitroaniline. | N-β-cyano-β-difluoromethylethyl-N-methylaniline. | reddish-orange. |
| Do. | N-β-cyano-β-difluoromethylethyl-N-methyl-m-toluidine. | Do. |
| 4-nitro-2-methylaniline. | N-β-cyano-β-difluoromethylethyl-N-β-hydroxyethylaniline. | Do. |
| Do. | N-β-cyano-β-trifluoromethylethyl-N-β-hydroxyethylaniline. | pinkish-orange. |
| 4-nitro-2-methoxyaniline. | N-β-cyano-β-difluoromethylethyl-N-β-hydroxyethylaniline. | reddish-orange. |
| Do. | N-β-cyano-β-trifluoromethylethyl-N-β-hydroxyethylaniline. | pinkish-orange. |
| 4-nitro-2-chloroaniline. | N-β-cyano-β-difluoromethylethyl-N-β-hydroxyethylaniline. | reddish-orange. |
| Do. | N-β-cyano-β-trifluoromethylethyl-N-β-hydroxyethylaniline. | pinkish-orange. |
| 4-nitro-2-bromoaniline. | N-β-cyano-β-difluoromethylethyl-N-β-hydroxyethylaniline. | Do. |
| Do. | N-β-cyano-β-trifluoromethylethyl-N-β-hydroxyethylaniline. | Do. |
| 4-nitro-2-fluoroaniline. | N-β-cyano-β-difluoromethylethyl-N-β-hydroxyethylaniline. | Do. |
| Do. | N-β-cyano-β-trifluoromethylethyl-N-β-hydroxyethylaniline. | Do. |
| 4-nitro-2-cyanoaniline. | N-β-cyano-β-difluoromethylethyl-N-β-hydroxyethylaniline. | reddish-orange. |
| Do. | N-β-cyano-β-trifluoromethylethyl-N-β-hydroxyethylaniline. | pinkish-orange. |
| 4-nitro-2-trifluoromethylaniline. | N-β-cyano-β-difluoromethylethyl-N-β-hyrdoxyethylaniline. | orange. |
| Do. | N-β-cyano-β-trifluoromethylethyl-N-β-hydroxyethylaniline. | Do. |
| 4-nitro-2-N-methylsulfonamidoaniline. | N-β-cyano-β-difluoromethylethyl-N-β-hydroxyethylaniline. | orange-red. |
| Do. | N-β-cyano-β-trifluoromethylethyl-N-β-hydroxyethylaniline. | Do. |
| 2-amino-5-nitrophenyl-methylsulfone. | N-β-cyano-β-difluoromethylethyl-N-β-hydroxyethylaniline. | Do. |
| Do. | N-β-cyano-β-difluoromethylethyl-N-β-hydroxyethyl-m-toluidine. | Do. |
| Do. | N-β-cyano-β-difluoromethylethyl-N-β-hydroxyethyl-m-chloroaniline. | Do. |
| 2-amino-5-nitrophenylmethyl ketone. | N-β-cyano-β-difluoromethylethyl-N-β-hydroxyethylaniline. | Do. |
| Do. | N-β-cyano-β-trifluoromethylethyl-N-β-hydroxyethylaniline. | Do. |
| 4-nitro-2-hydroxyaniline. | N-β-cyano-β-difluoromethylethyl-N-β-hydroxyethylaniline. | Do. |
| Do. | N-β-cyano-β-trifluoromethylethyl-N-β-hydroxyethylaniline. | Do. |
| 4-nitro-2,6-dichloroaniline. | do. | brownish-orange. |
| Do. | N-β-cyano-β-difluoromethylethyl-N-β-hydroxyethyl-m-toluidine. | Do. |
| 4-nitro-2-chloro-6-bromoaniline. | N-β-cyano-β-trifluoromethylethyl-N-β-hydroxyethylaniline. | Do. |
| 4-nitro-2-chloro-6-fluoroaniline. | N-β-cyano-β-difluoromethylethyl-N-β-hydroxyethylaniline. | Do. |
| 4-nitro-2-chloro-6-trifluoromethylaniline. | do. | Do. |
| Do. | N-β-cyano-β-trifluoromethylethyl-N-β-hydroxyethylaniline. | Do. |
| 4-nitro-2,6-di-trifluoromethylaniline. | N-β-cyano-β-difluoromethylethyl-N-β-hydroxyethylaniline. | Orange. |
| Do. | N-β-cyano-β-trifluoromethylethyl-N-β-hydroxyethylaniline. | Do. |
| 2,4,6-tri-methylsulfonylaniline. | N-β-cyano-β-difluoromethylethyl-N-β-hydroxyethylaniline. | orange-yellow. |
| Do. | N-β-cyano-β-trifluoromethylethyl-N-β-hydroxyethylaniline. | Do. |

Compounds having the formula:

IV. 

are prepared by reacting a primary arylamine having the formula:

V. $B-NH_2$ with α-difluoromethylacrylonitrile or α-trifluoromethylacrylonitrile. B and X in Formulas IV and V have the meaning previously assigned to them.

Compounds having the formula numbered III are prepared by reacting a compound having the formula:

VI. 

with α-difluoromethylacrylonitrile or α-trifluoromethylacrylonitrile or by reacting a compound having the formula numbered IV with an alkylene oxide, an alkyl halide, an alkylene chlorohydrin, etc.

The following examples illustrate the preparation of the new coupling components of the invention.

EXAMPLE A

*Preparation of N-β-cyano-β-trifluoromethylethylaniline*

12.1 parts of α-trifluoromethylacrylonitrile, 9.3 parts of aniline and 1 part of acetic acid were mixed at 0° C. and slowly warmed to 95° C. and maintained at 95° C. for 15 hours. The reaction mixture was washed with water and then distilled under reduced pressure. N-β-cyano-β-trifluoromethylethylaniline boiling at 140° C.–150° C./3 mm. was obtained as a clear liquid.

By the use of 10.3 parts of α-difluoromethylacrylonitrile in place of α-trifluoromethylacrylonitrile, N-β-cyano-β-difluoromethylethylaniline is obtained.

EXAMPLE B

*Preparation of N-β-cyano-β-trifluoromethylethyl-N-β-hydroxyethylaniline*

13.7 parts of N-β-hydroxyethylaniline, 12.1 parts of α-trifluoromethylacrylonitrile and 10.5 parts of acetic acid were mixed at 0° C. and slowly warmed to 95° C.–100° C. The temperature of 95° C.–100° C. was maintained for 30 hours. The reaction mixture was washed with water and then distilled under reduced pressure. N-β-cyano-β-trifluoromethylethyl-N-β-hydroxyethylaniline was recovered as a colorless, viscous liquid boiling at 198° C.–202° C./8 mm.

By the use of 10.3 parts of α-difluoromethylacrylonitrile in place of α-trifluoromethylacrylonitrile, N-β-cyano-β-difluoromethylethyl-N-β-hydroxyethylaniline is obtained.

EXAMPLE C

*Preparation of N-β-cyano-β-trifluoromethylethyl-N-β-hydroxyethyl-m-toluidine*

21.6 parts of N-β-cyano-β-trifluoromethylethyl-m-toluidine were reacted in an autoclave with 5 parts of ethylene oxide at 180° C.–185° C. for 4 hours. Upon cooling, the contents of the autoclave were removed and distilled under reduced pressure. N-β-cyano-β-trifluoromethylethyl-m-toluidine boiling at 213° C.–215° C./7 mm. was obtained as a clear, colorless liquid.

α-Difluoromethylacrylonitrile and α-trifluoromethylacrylonitrile are prepared as follows:

EXAMPLE D

*Preparation of α-difluoromethylacrylonitrile*

24 grams of 1,1-difluoroacetone cyanhydrin were heated with 27 grams of thionyl chloride on a steam bath under a reflux condenser for a period of about 6 hours. The excess of acid chloride and acids which formed in the reaction were removed by washing the reaction mixture with aqueous sodium bicarbonate, after which the mixture was fractionated to give alpha-difluoromethylacrylonitrile and alpha-difluorochloro isobutyronitrile. The above acrylonitrile can also be prepared by pyrolysis above 150° C. of compounds having the general formula:

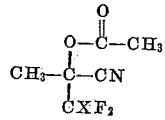

wherein X represents an atom of hydrogen, a fluorine atom or a chlorine atom.

EXAMPLE E

*Preparation of α-trifluoromethylacrylonitrile*

13.9 grams of 1,1,1-trifluoroacetone cyanhydrin were dissolved in 100 ccs. of dry pyridine and 14 grams of thionyl chloride were added dropwise while stirring at 0° C. The stirring was continued for several hours and the reaction mixture allowed to warm gradually to 25° C. at which point it was maintained for several more hours. At the end of this time, the reaction mixture was rapidly warmed to about 100° C. and kept at this temperature for 15 minutes, when it was poured into ice water and made first acid to Congo paper with 5 per cent sulfuric acid. The aqueous mixture was extracted with diethyl ether, dried over anhydrous sodium sulfate and distilled.

The product obtained was alpha-trifluoromethylacrylonitrile, a colorless liquid having a boiling point of approximately 73° C.

The azo dye compounds of the invention can be applied to the textile materials named hereinbefore in the form of an aqueous dispersion and are ordinarily so applied. To illustrate, the dye compound is finely ground with a dispersing agent such as sodium lignum sulfonate, Turkey red oil, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

We claim:
1. The azo compounds having the general formula:

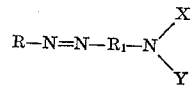

wherein R represents a radical of the benzene series free of water-solubilizing groups, $R_1$ represents an arylene radical of the benzene series free of water-solubilizing groups, X represents a member selected from the group consisting of a β-cyano-β-difluoromethylethyl group and a β-cyano-β-trifluoromethylethyl group and Y represents a member selected from the group consisting of a hydrogen atom, an alkyl group having 1 to 6, inclusive, carbon atoms, a hydroxyalkyl group having 2 to 5, inclusive, carbon atoms, an alkoxyalkyl group having 3 to 6, inclusive, carbon atoms, a hydroxyalkoxyalkyl group having 4 to 6, inclusive, carbon atoms, a cyanoalkyl group having 2 to 6, inclusive, carbon atoms, an alkenyl group having 2 to 4, inclusive, carbon atoms and a —$(CH_2)_m$—$COOR_2$ group wherein $m$ is a whole number from 1 to 3, inclusive, and $R_2$ represents an alkyl group having 1 to 4, inclusive, carbon atoms and wherein the

grouping is joined to a carbon atom of the arylene radical $R_1$ in para position to the azo bond shown.

2. The azo compounds having the general formula:

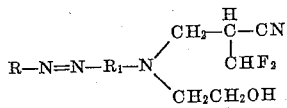

wherein R represents a radical of the benzene series free of water-solubilizing groups and $R_1$ represents an arylene radical of the benzene series free of water-solubilizing groups and wherein the

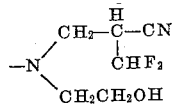

grouping is joined to a carbon atom of the arylene radical $R_1$ in para position to the azo bond shown.

3. The azo compounds having the general formula:

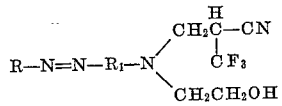

wherein R represents a radical of the benzene series free of water-solubilizing groups and $R_1$ represents an arylene radical of the benzene series free of water-solubilizing groups and wherein the

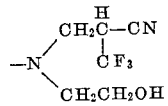

grouping is joined to a carbon atom of the arylene radical $R_1$ in para position to the azo bond shown.

4. The azo compounds having the general formula:

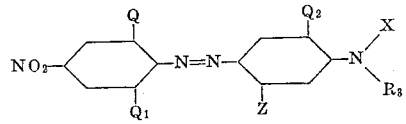

wherein Q represents a member selected from the group consisting of a hydrogen atom, a bromine atom, a chlorine atom and a trifluoromethyl group, $Q_1$ represents a member selected from the group consisting of a chlorine atom, a bromine atom, a fluorine atom, a trifluoromethyl group and a methylsulfonyl group, $Q_2$ represents a member selected from the group consisting of a hydrogen atom, a methoxy group and an ethoxy group, $R_3$ represents a member selected from the group consisting of a β-hydroxyethyl group, a γ-hydroxypropyl group and a β,γ-dihydroxypropyl group, X represents a member selected from the group consisting of a β-cyano-β-difluoromethylethyl group and a β-cyano-β-trifluoromethylethyl group and Z represents a member selected from the group consisting of a hydrogen atom, a chlorine atom, a bromine atom, a fluorine atom, a methyl group and an ethyl group.

5. The azo compound having the formula:

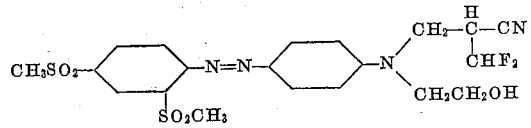

6. The azo compound having the formula:

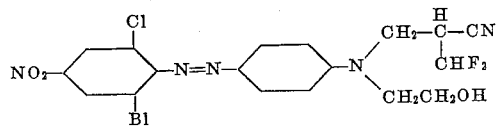

7. The azo compound having the formula:

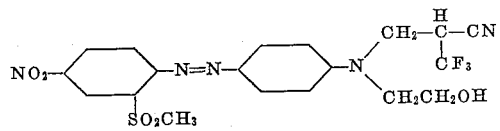

8. The azo compound having the formula:

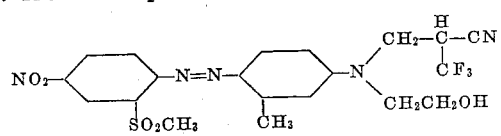

9. The azo compound having the formula:

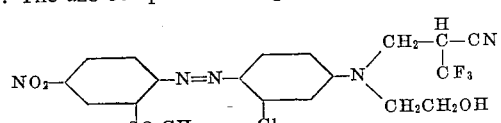

References Cited in the file of this patent

UNITED STATES PATENTS

| | | |
|---|---|---|
| 2,064,332 | Zwilgmeyer | Dec. 15, 1936 |
| 2,206,108 | Muller et al. | July 2, 1940 |
| 2,492,971 | Dickey | Jan. 3, 1950 |
| 2,492,972 | Dickey | Jan. 3, 1950 |
| 2,500,218 | Towne et al. | Mar. 14, 1950 |
| 2,574,505 | Sletzinger et al. | Nov. 13, 1951 |
| 2,590,092 | Dickey | Mar. 25, 1952 |

FOREIGN PATENTS

| | | |
|---|---|---|
| 540,597 | Great Britain | Oct. 23, 1941 |